(12) United States Patent
Gordon et al.

(10) Patent No.: US 10,936,804 B2
(45) Date of Patent: Mar. 2, 2021

(54) SPREADSHEET CELL CALCULATION VIEW PROVIDING MULTIPLE-REPRESENTATION EDITING

(71) Applicant: MICROSOFT TECHNOLOGY LICENSING, LLC, Redmond, WA (US)

(72) Inventors: Andrew Donald Gordon, Cambridge (GB); Neil Toronto, Cambridge (GB); Simon Loftus Peyton Jones, Cambridge (GB); Advait Sarkar, Cambridge (GB); Richard Matthew McCutchen, Cambridge, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 164 days.

(21) Appl. No.: 16/048,208

(22) Filed: Jul. 27, 2018

(65) Prior Publication Data

US 2020/0034415 A1 Jan. 30, 2020

(51) Int. Cl.
*G06F 40/18* (2020.01)
(52) U.S. Cl.
CPC .................... *G06F 40/18* (2020.01)
(58) Field of Classification Search
None
See application file for complete search history.

(56) References Cited

U.S. PATENT DOCUMENTS

| | | | |
|---|---|---|---|
| 7,266,763 B2 | 9/2007 | Peyton-Jones et al. | |
| 7,415,481 B2 | 8/2008 | Becker et al. | |
| 9,037,959 B2 | 5/2015 | Rapp et al. | |
| 9,501,462 B2 | 11/2016 | Ren | |
| 9,703,767 B2 | 7/2017 | Bedard et al. | |
| 2003/0056181 A1* | 3/2003 | Marathe | G06F 40/18 715/267 |
| 2005/0081141 A1 | 4/2005 | Jonsson | |
| 2008/0243823 A1* | 10/2008 | Baris | G06F 40/18 |
| 2009/0113283 A1* | 4/2009 | Sol | G06F 40/18 715/212 |
| 2010/0083079 A1* | 4/2010 | Rapp | G06F 40/18 715/212 |
| 2016/0103819 A1* | 4/2016 | Hogan | G06F 40/18 715/217 |

(Continued)

OTHER PUBLICATIONS

Abraham, Robin, Martin Erwig, Steve Kollmansberger, and Ethan Seifert. "Visual specifications of correct spreadsheets." In 2005 IEEE Symposium on Visual Languages and Human-Centric Computing (VL/HCC'05), pp. 189-196. IEEE, 2005. (Year: 2005).*

(Continued)

*Primary Examiner* — Frank D Mills
(74) *Attorney, Agent, or Firm* — NovoTechIP International PLLC (57) ABSTRACT

To prevent spreadsheet errors, a solution is disclosed that provides a multiple-region spreadsheet including additional representations, providing readily usable creation and editing of computational structure operations, without altering the conventional grid representation of a spreadsheet or its formula syntax. The multiple-region spreadsheet may include a traditional row-column arrangement of cells in a grid format, along with a calculation view pane intended to display underlying formulas used in the grid along with truncated cell assignments.

11 Claims, 7 Drawing Sheets

(56) References Cited

U.S. PATENT DOCUMENTS

2016/0253307 A1 9/2016 Kraynak et al.
2019/0340219 A1* 11/2019 Schoedl ............... G06F 40/111

OTHER PUBLICATIONS

"Microsoft Excel—Wikipedia", Retrieved From: https://en.wikipedia.org/w/index.php?title=Microsoft_Excel&oldid=808192493#cite_note-82, Nov. 1, 2017, 24 Pages.

Isakowitz, et al., "Toward a Logical/Physical Theory of Spreadsheet Modeling", In Proceedings of the ACM Transactions on Information Systems, vol. 13, Issue No. 1, Jan. 1995, pp. 1-37.

Mansfield, Richard, "Mastering VBA for Microsoft Office 2010", In Publication of John Wiley & Sons, Aug. 2010, 46 Pages.

"International Search Report and Written Opinion Issued in PCT Application No. PCT/US2019/038093", dated Dec. 17, 2019, 22 Pages.

"Define and use names in formulas", Retrieved from https://support.office.com/en-us/article/define-and-use-names-in-formulas-4d0f13ac-53b7-422e-afd2-abd7tf379c64, Retrieved on Jun. 12, 2018, 13 Pages.

Abraham, et al., "Header and Unit Inference for Spreadsheets Through Spatial Analyses", In Proceedings of IEEE Symposium on Visual Languages and Human Centric Computing, Sep. 26, 2004, 8 Pages.

Ainsworth, Shaaron, "The functions of multiple representations", In Journal of Computers & Education, vol. 33, Issue 2-3, Sep. 1, 1999, pp. 131-152.

Aurigemma, et al., "Evaluating the effectiveness of static analysis programs versus manual inspection in the detection of natural spreadsheet errors", In Journal of Organizational and End User Computing, vol. 26, No. 1, Jan. 2014, 4 Pages.

Burnett, et al., "Forms/3: A first-order visual language to explore the boundaries of the spreadsheet paradigm", In the Journal of Functional Programming, vol. 11, No. 2, Mar. 2001, pp. 155-206.

Chang, et al., "Using and Exploring Hierarchical Data in Spreadsheets", In Proceedings of CHI Conference on Human Factors in Computing Systems, May 7, 2016, pp. 2497-2507.

Cheng, et al., "Static analysis of spreadsheet applications for type-unsafe operations detection", In Proceedings of European Symposium on Programming Languages and Systems, Apr. 11, 2015, pp. 1-28.

Compeau, et al., "Computer self-efficacy: Development of a measure and initial test", In Journal of MIS Quarterly, vol. 19, No. 2, Jun. 1995, pp. 189-211.

Feng, et al., "Log-transformation and its implications for data analysis", In Journal of Shanghai Archives of Psychiatry, vol. 26, No. 2, Apr. 26, 2014, pp. 105-109.

Foster, et al., "Combinators for bidirectional tree transformations: A linguistic approach to the view-update problem", In Journal of ACM Transactions on Programming Languages and Systems, vol. 29, Issue 3, May 2007, pp. 1-65.

Fowler, et al., "Refactoring: improving the design of existing code", In Publication of Addison-Wesley Professional, Jul. 8, 1999, pp. 1-337.

Gorinova, et al., "A live, multiple-representation probabilistic programming environment for novices", In Proceedings of the CHI Conference on Human Factors in Computing Systems, May 7, 2016, 5 Pages.

Green, et al., "Usability Analysis of Visual Programming Environments: a 'cognitive dimensions' framework", In Journal of Visual Languages and Computing, vol. 7, No. 2, Jan. 1996, 50 Pages.

Hart, et al., "Development of NASA-TLX (Task Load Index): Results of Empirical and Theoretical Research", In Journal of Advances in Psychology, Jan. 1, 1988, 46 Pages.

Hendry, et al., "Creating, comprehending and explaining spreadsheets: a cognitive interpretation of what discretionary users think of the spreadsheet model", In International Journal of Human Computer Studies vol. 40, No. 6, Jun. 1994, pp. 1033-1065.

Hermans, et al., "Detecting and refactoring code smells in spreaadsheet formulas", In Journal Empirical Software Engineering, vol. 20, Issue 2, Apr. 1, 2015, pp. 1-30.

Hermans, et al., "Detecting and visualizing inter-worksheet smells in spreadsheets", In Proceedings of 34th International Conference on Software Engineering, Jun. 2, 2012, pp. 441-451.

Hermans, et al., "Spreadsheets are Code: An Overview of Software Engineering Approaches Applied to Spreadsheets", In Proceedings of IEEE 23rd International Conference on Software Analysis, Evolution, and Reengineering, Mar. 14, 2016, pp. 56-65.

Igarashi, et al. "Fluid Visualization of Spreadsheet Structures", In Proceedings of IEEE Symposium on Visual Languages 1998, Sep. 1, 1998, 8 Pages.

Jones, et al., "A user-centered approach to functions in Excel", In Proceedings of the eighth ACM SIGPLAN International conference on Functional programming, Aug. 25, 2003, pp. 165-176.

Kay, Alan, "Computer Software", In Journal of Scientific American, vol. 251, Issue 3, Sep. 1984, pp. 53-59.

Macedo, et al., "Bidirectional spreadsheet formulas", In Proceedings of IEEE Symposium on Visual Languages and Human-Centric Computing, Jul. 28, 2014, pp. 161-168.

Mary, "Name a range of cells", Retrieved from https://web.archive.org/web/20170119051745/https:/support.google.com/docs/answers/63175?hl=en&co=GENIE.Platform%3DDesktop, Jan. 19, 2017, 2 Pages.

Miller, et al., "Sumwise: A Smarter Spreadsheet", In Proceedings of European Spreadsheet Risks Interest Group, Aug. 6, 2010, 7 Pages.

Mittermeir, et al., "Finding High-Level Structures in Spreadsheet Programs", In Proceedings of IEEE Ninth Working Conference on Reverse Engineering, Oct. 29, 2002, 14 Pages.

Panko, Raymond R, "What we know about spreadsheet errors", In Journal of Organizational and End User Computing, vol. 10, No. 2, Apr. 1998, 35 Pages.

Resnick, et al., "Scratch: programming for all", In Journal of Communications of the ACM vol. 52, No. 11, Nov. 1, 2009, pp. 60-67.

Sarkar, et al., "Interactive visual machine learning in spreadsheets", In Proceedings of IEEE Symposium on Visual Languages and Human-Centric Computing, Oct. 18, 2015, 5 Pages.

Sarkar, Advait, "The impact of syntax colouring on program comprehension", In Proceedings of 26th Annual Conference of Psychology of Programming Interest Group, Jul. 2015, pp. 1-10.

Sfard, Anna, "On the dual nature of mathematical conceptions: Reflections Privileged and Confidential 11 HH/AS/NC on processes and objects as different sides of the same coin", In Journal of Educational Studies in Mathematics, vol. 22, No. 1, Feb. 1, 1991, pp. 1-36.

Singh, et al., "Melford: Using Neural Networks to Find Spreadsheet Errors", In Technical Report of MSR-TR-2017-5, Jan. 31, 2017, pp. 1-13.

Stead, et al., "Learning syntax as notational expertise when using drawbridge", In Proceedings of the Psychology of Programming Interest Group Annual Conference, Jun. 25, 2014, pp. 1-12.

Tanimoto, S.L., "VIVA: A visual language for image processing", In Journal of Visual Languages & Computing, vol. 1, Issue 2, Jun. 1, 1990.

Trapani, Gina, "Reference Cell Ranges by Label", Retrieved From https://lifehacker.com/292522/reference-cell-ranges-by-label, Aug. 23, 2007, 2 Pages.

Zhang, et al., "Automated refactoring of nested-if formulae in spreadsheets", In Journal of Computing Research Repository, Dec. 2017, pp. 1-11.

Abhimanyu, "Cross Platform Custom Functions", Application As Filed in U.S. Appl. No. 15/889,916, filed Feb. 6, 2016, 44 Pages.

Andrew, Gordon, "Natively Handling Approximate Values In Spreadsheet Applications", Application As Filed in U.S. Appl. No. 16/005,469, filed Jun. 11, 2018, 53 Pages.

Rishabh, Singh, "Predicting Spreadsheet Properties", Application As Filed in U.S. Appl. No. 15/408,334, filed Jan. 17, 2017, 50 Pages.

* cited by examiner

SPREADSHEET CELL CALCULATION VIEW PROVIDING MULTIPLE-REPRESENTATION EDITING

TECHNICAL FIELD

This disclosure relates generally to a graphical user interface (GUI) for spreadsheets and, more particularly, to machine display and associated GUI enhanced inspection and editing of cell formulae, definitions, and dependencies in spreadsheets.

BACKGROUND

Spreadsheets are commonly used to show data, while hiding the computations that produce the resulting data. Because the computations are hidden, spreadsheets are often hard to understand, explain, debug, audit, and/or maintain. As with any large body of code, spreadsheets can contain errors of many kinds. Given the heavy dependence of many industries on spreadsheets, these errors can have catastrophic consequences. As a result, spreadsheet errors are often ubiquitous and costly, an unfortunate combination that is well-reported.

A large class of spreadsheet errors can be attributed to the inability to clearly see the underlying computational structure. This is because the graphical display showing the sheet does not intrinsically convey how values in each cell are computed, which groups of cells have shared formulas, and how cells depend on each other. This can create hidden dependencies in the spreadsheet data flow. Apart from individually inspecting cell formulas or relying on secondary notation provided by the spreadsheet author, there are no affordances for auditing the calculations of a spreadsheet, which makes auditing tedious and error prone. This is particularly the case since the display is typically too small to contain all formulas at once in large spreadsheets. Moreover, visibility is impaired by the inability to display formulas and their results simultaneously. The "Show formulas" option, which is used in some spreadsheets to displays each cell's formula in the cell instead of the computed value, is also impractical, since the length of formulas typically exceeds the cell width, leading to truncation.

Current spreadsheet designs also provide insufficient support for higher-level representation of repeated computational or other definitional structure. For example, in a common form of spreadsheet, the first column is a list of data, and each other column computes something from the base data. The formulas in each row repeat the calculation for the data in that row. There are only as many distinct formulas as there are columns. The complexity of building and testing this type of spreadsheet is deeply affected by the number of rows. This is because the user is responsible for manually ensuring that the column formula is precisely copied to the correct number of rows. Moreover, any subsequent edits to column formulas are viscous as well as error prone, as they must be correctly propagated to the correct range, which involves identifying all the cells that the author intended to contain that formula, an intention for which there may not be any explicit record.

Moreover, formulas in spreadsheets suffer from a lack of readable names. Common grid cell references (e.g., A1, B2, etc.) often contain no information regarding the value the cell might represent. As a result, they can be easily mistyped as other valid grid cell references, leading to a silent error.

Disclosed systems and methods, described in greater detail in paragraphs that follow and the referenced drawings, provide technical solutions to the above-described technical problems, and provide further technical benefits and advantages.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A computing device is disclosed, and can include a logic machine, a display screen coupled to the logic machine, and a storage machine, coupled to the logic machine, that can retrievably store instructions executable by the logic machine that, when executed, cause the logic machine to display, at a first region of a display screen, a row-column arrangement of data, indicating data content of cells within a row-column arrangement of cells, and display, at a second region of the display screen, formula assignments for one or more cells within the row-column arrangement of cells, including display of a formula and an assigned range of a plurality of cells for the formula.

A method is disclosed, and can include receiving a machine-understandable row-column arrangement of data, indicating data content of cells within a row-column arrangement of cells; displaying, at a first region of a display screen, the row-column arrangement of data, indicating the data content of cells within the row-column arrangement of cells; and displaying, at a second region of the display screen, a columnar grid of visible pseudocells, each visible pseudocell including a representation of a formula associated with one or more cells within the row-column arrangement of cells.

Another method is disclosed, and can include displaying, at a first region of a display screen, a row-column spatial arrangement of data, corresponding to stored row-column arrangement of cells, each of at least a plurality of the cells corresponding to a respective formula; grouping the row-column arrangement of cells into a plurality of row-column equivalence classes, each row-column equivalence class including a plurality of cells with a mutually identical formula; detecting a block of spatially adjacent cells within a row-column equivalence class among the plurality of row-column equivalence classes; generating a range instance, based at least in part on the block of spatially adjacent cells, that can indicate the corresponding identical formula and a range of cells within the stored row-column arrangement of cells to which the formula apply; and displaying, at a second region of the display screen, a graphic representation of the range instance that can include the formula and the range of cells.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the disclosed subject matter. It will be apparent to persons of ordinary skill, upon reading this description, that various aspects can be practiced without such details.

Spreadsheet errors can be ubiquitous and costly. A large class of these errors can be attributed to either the lack of functionality for observing the underlying computational structure, or poor support for features such as encapsulation, and reuse. To prevent and/or quickly identify spreadsheet errors, a technical solution is provided herein that provides a multiple-region spreadsheet containing additional representations that provide for convenient, easy-to-use, multi-featured creation and editing of computational structure, without altering the conventional grid representation or its formula syntax. The multiple-region spreadsheet can include a traditional row-column arrangement of cells in a grid format, along with a calculation view pane intended to display underlying formulas used in the grid along with truncated cell assignments. Use of such multiple representation displays can significantly improve user performance in spreadsheet authoring and debugging tasks.

FIGS. 1A-1D illustrate exemplary graphical user interface display screens in a concurrent, two-screen region display, for creating, editing and observing cells in a row-column arrangement.

Figure 1A:
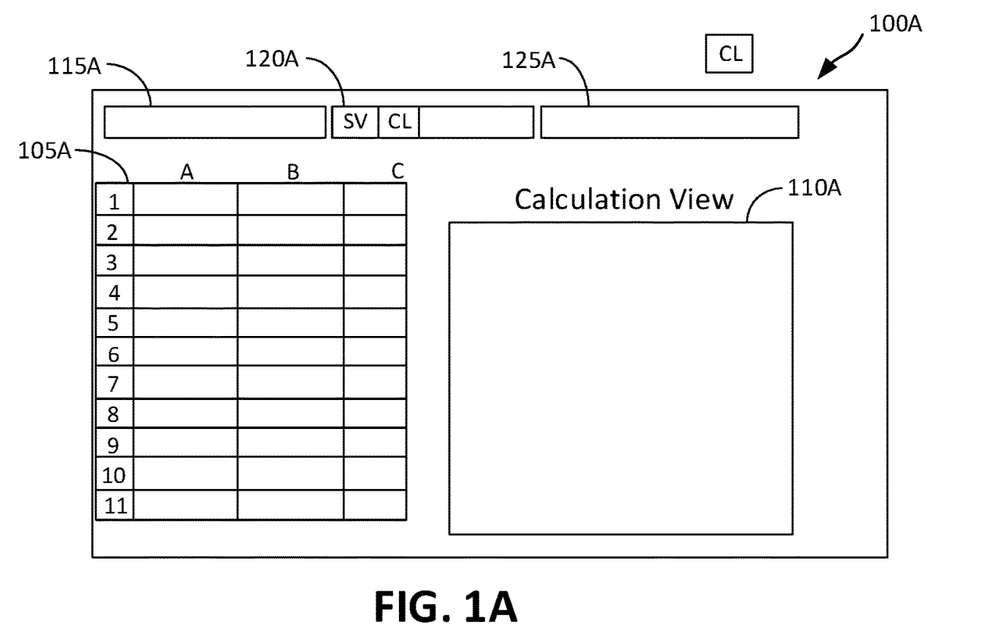
FIGS. 1A-1D illustrate exemplary graphical user interface display screens in a concurrent, two-screen region display, for creating, editing and observing cells in a row-column arrangement.

FIG. 1A depicts a graphical user interface screen 100A displaying a spreadsheet. The screen 100A includes two display regions 105A and 110A, along with a formula bar having three boxes 115A, 120A and 125A. Box 120A can include Save (SV) button and Cancel (CL) button, operations of which are described in greater detail in later paragraphs. A first display region 105A depicts multiple rows and columns of the spreadsheet in a grid format, while the second display region 110A provides an alternative representation of the spreadsheet in a calculation view format. The display region 105A includes rows 1 through 11 and columns A through C that provide for a row column arrangement of data in a grid format. The calculation view pane 110A provides a second display region for displaying calculation related information relating to the cells displayed in the first display region 105A. The first and second display regions 105A and 110A are interrelated such that when a change is made in one of the two display regions, the corresponding section of the other display region is automatically changed.

Figure 1B:
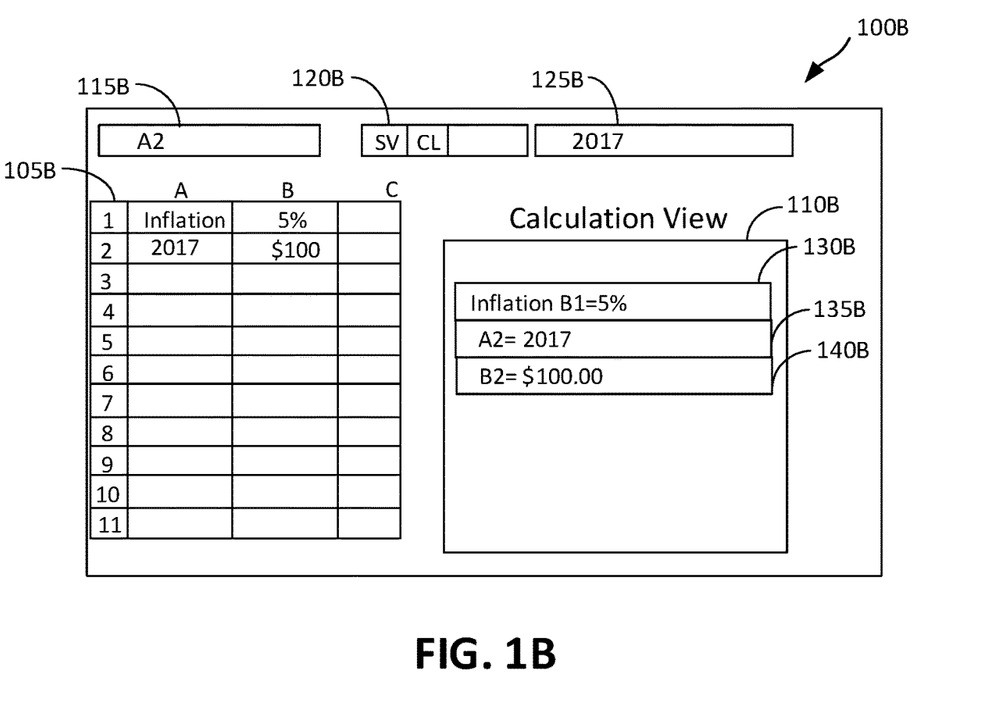

FIG. 1B depicts a graphical user interface screen 100B that is similar to the graphical user interface screen 100A of FIG. 1A except for some of the row and columns of the grid display 105B including data and the corresponding calculation view including text. Row 1 in the grid display 105A has been filled with the data "Inflation" in column A and 5% in column B to show that inflation is 5%. This generally means that row 1 in the grid display 105B is for displaying inflation. Assigning a name to a grid cell in instances such as this can be useful for users, as names are easier to remember and use than specific cell row and column numbers. For example, referring to row 1, column B as "Inflation" can help a user easier formulate equations. Easy-to-use and reliable naming conventions are not commonly available in currently used spreadsheets. This lack of meaningful naming for grid cell references leads to unreadability and error proneness in formulas. The calculation view pane 110B presents an opportunity to lower the interactional and cognitive costs for using names. To achieve this, the calculation view pane provides an easy method of assigning a name to a cell or a range of cells by using a specific syntax. In one implementation, the user can employ the following syntax: Designated name Cell=Formula. For example, to name the column B, row 1 cell "Inflation" and give it the value of 5%, the following syntax may be used: Inflation B1=5%. In this manner, the calculation view pane 110B can be used to easily and efficiently name a cell and assign it a value. This can be done by entering the text in a line of the calculation view pane 110B, as shown on line 130B. Subsequent to this naming, to compute costs, the user can write the formula in terms of Inflation rather than B1, which is more readable, more memorable, more intelligible, and more difficult to mistype as a different but valid reference. Alternative naming syntaxes may be used in different implementations. For example, any of the following syntaxes can be used: Inflation[B1]=5%; Inflation in B1=5%; B1 as Inflation=5%.

For cells that are not named, the value of the cell may simply be displayed in the calculation view pane 110B. This provides a clear view of the underlying formula for each cell displayed in the grid view 105B. The data for the cells may be entered in the grid view 105B. For example, the user may type 2017 in cell A2 and $100 in cell B2. In such a case, the calculation view pane 110B, may automatically display the corresponding formulas on lines 135B and 140B. In this manner, the formulas for the cells may be viewed and/or checked for accuracy in one place, instead of having to review the formula for each cell in the formula bar by checking each box 115B, 120B and 125B which display the cell number/name, the status of the formula, and the actual formula, respectively. Referring to box 120B, if the user does not wish to save the above-described entry, the user can activate the CL button. If the user wishes to save, and activate, the above-described entry, the user can activate the SV button. In addition to displaying the formulas, the user is able to enter the formula A2=2017 on line 135B directly, which may automatically populate the cell A2 with the value 2017.

Each line of the calculation view pane may be referred to as a pseudocell. Calculation view creates an explicit visual distinction between lines, thus creating a columnar grid of pseudocells. This differentiates the calculation view pane from traditional text editors and instead makes the calculation view pane appear familiar to the user, due to its similarity to the grid. It can also reinforce the preference that there should only be one assignment per line.

Figure 1C:
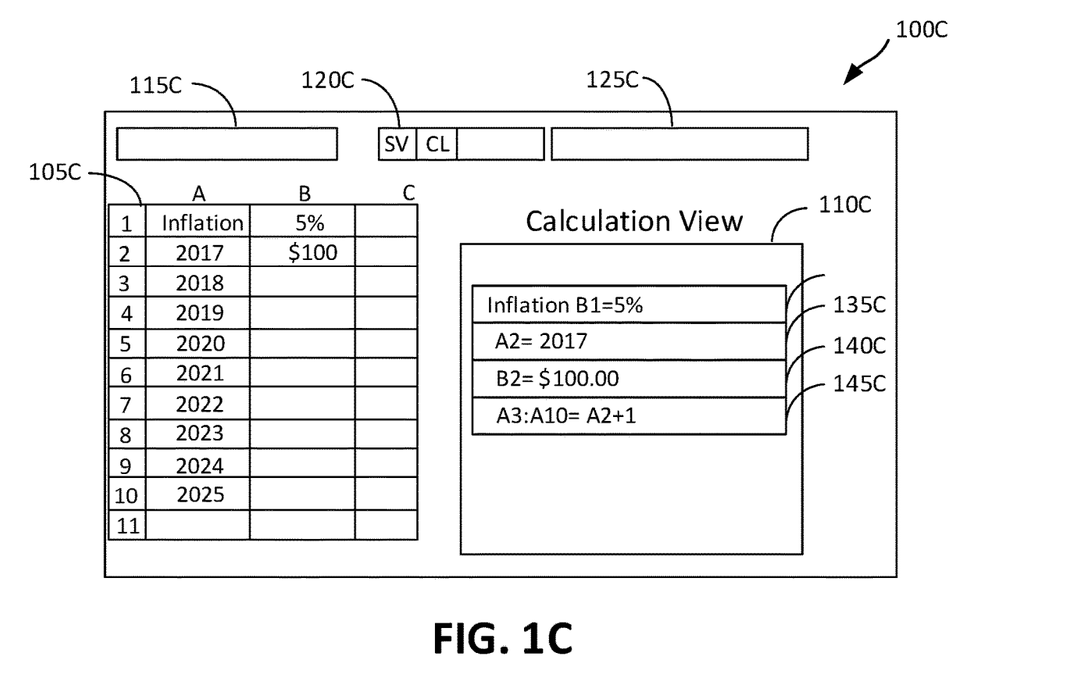

FIG. 1C depicts how the same formula can be assigned to a range of cells by using the calculation view pane 110C. The graphical user interface screen 100C is similar to the graphical user interface screen 100B of FIG. 1B except for a few more rows of the grid display 105C being filled with data and the corresponding calculation view including an additional line of text. The grid display 105C shows that the rows 2 through 10 have been filled with the range of values 2017 through 2025, consecutively. This may be done in currently used spreadsheets by utilizing a drag-fill feature, which copies a single formula to a range of cells. Although this feature is useful, it is error prone in large spreadsheets, for reasons such as the correct number of rows not being selected. Moreover, it is difficult to check for errors as each cell would need to be reviewed to determine accuracy.

To avoid this and provide an easy method for confirming accuracy, the calculation view pane 110C can display the range assignment formula in a line such as, for example, the formula shown on line 145C as A3:A10=A2+1. This shows that formula=A2+1 is placed in A3 and drag-filled, which appears in the first display region 105A as A3 through A10 contain data that is a number consecutively increased by 1 for each cell. This formula may be entered in the calculation view pane 110C to automatically populate cells A3 to A10. Entering this formula may have an effect identical to entering the formula=A2+1 into the top-left cell of the range A3:A10, and then drag-filling over the rest of the range. This formula is selected in one implementation because the syntax uses the literal formula for the top-left cell. Because the user may be familiar with the drag-filling feature, use of the formula is easy to remember and use. In this manner, range assignment exposes a low-abstraction syntax for array/matrix assignment.

Alternative formulas may be used in different implementations for range assignments. For example, an alternative that does not rely on knowledge of copy-paste semantics, can be to use R1C1 (row 1, column 1) notation for the range, which in this example would be R3C1:R10C1. The range, in terms of row-column offset, can be written as: A3:A10=(R[−1]C[0]+1), which uses row and column numbers with respect to the cell being filled. R[−1] indicates the previous row and C[0] indicates the same column. This implementation may be clearer, because the same formula is assigned to every cell, but understanding the formula may require knowledge of the more syntax-based R1C1 notation.

By providing for range assignment in the calculation view pane 110C, the screen 100C represents all formulas for the columns A3:A10 in one block using a single formula. This greatly improves visibility of the formulas in the spreadsheet. For example, for a spreadsheet having thousands of rows, the calculation view representation still shows a single range assignment per column. Moreover, the representation greatly reduces the viscosity and error-proneness of editing a block of formulas. Instead of manual copying or drag-filling, the user can simply edit the formula in the range assignment. The range itself can also be edited to adjust the extent of the copied formula precisely and easily.

Figure 1D:
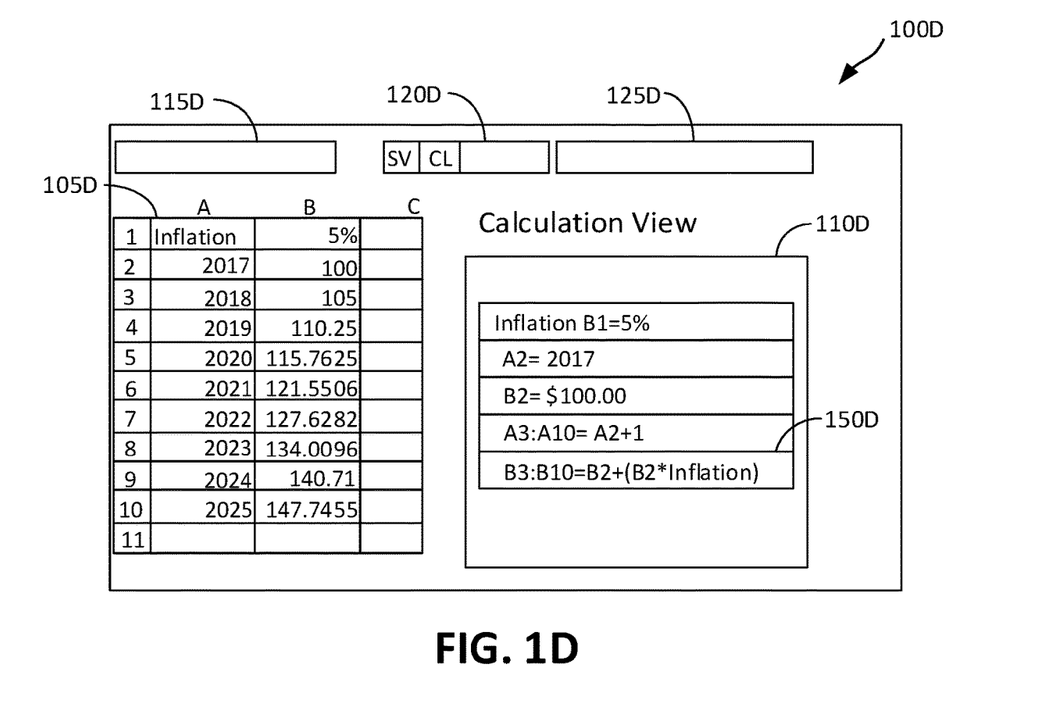

FIG. 1D depicts another example of assigning a range to the cells of a spreadsheet by using the calculation view pane 110D. The graphical user interface screen 100D is similar to the graphical user interface screen 100C of FIG. 1C except for a few more rows of the column B of the grid display 105D being filled with data and the corresponding calculation view including an additional line of text. The grid display 105D shows that the rows 3 through 10 of column B have been filled with data. The data corresponds to the formula entered on line 150D of the calculation view pane 110D which displays the formula B3:B10=B2+(B2*Inflation). This formula displays both use of range assignment and name assignments to simplify entering data into a spreadsheet and enable efficient and effective audits for error. The formula displayed on line 150D assigns a value to cells B3:B10 in one place and refers to cell A using a name instead of the cell row and column numbers.

Thus, in one implementation, the textual notation of an assignment Range=Formula can be used in the calculation view pane to replace the function of entering the Formula into the top left cell of the Range and pasting that formula into every other cell in the Range in the grid display. Furthermore, an assignment Name Range=Formula can be used in the calculation view pane to additionally bind the name Name to the cell range Range. The following additional textual notations can be used to enter text into the calculation view pane:

Cell::=A1-notation
Range::=Cell|(Cell:Cell)|(Cell::{rows,cols}), where rows and columns are the numbers of rows and columns in the range (e.g., the range H4:H6 can be displayed as H4::{3,1})
Literal::=number|string (e.g., 2017 or "Hello")
Name::=identifier (e.g., Inflation B1 to name cell B1 Inflation)
Fun::=SUM|SQRT| . . . (to use known functions in a formula, e.g., SQRT(A1) for square root of A1)
Formula::=Literal|Range|Name|Fun(Formula$_1$, . . . , Formula$_N$)| . . . (e.g., 2017, B2, Inflation, or SQRT(B2))

Figure 2A:
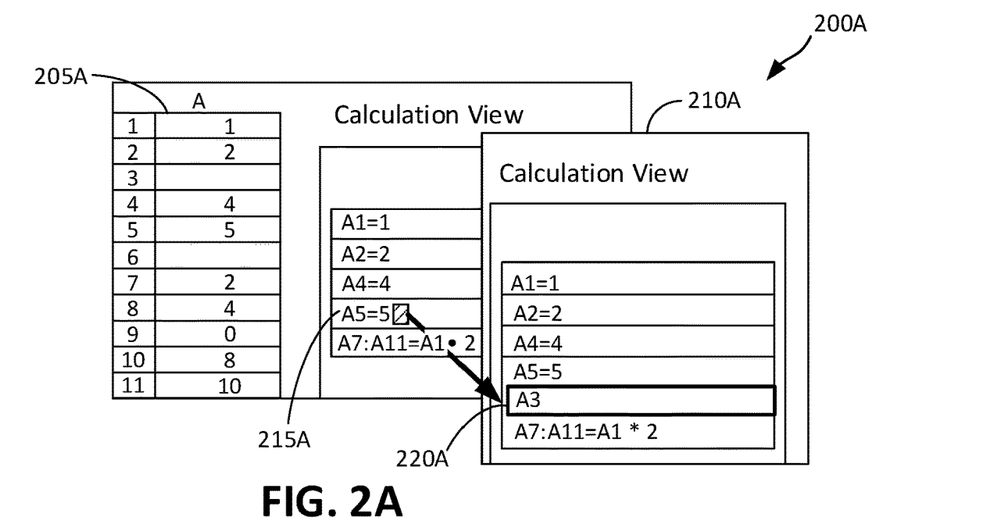
FIGS. 2A-2C illustrate exemplary user graphical interface display screens depicting exemplary steps in ordering one or more pseudocells in one region of a multi-region display screen.
Figure 2B:
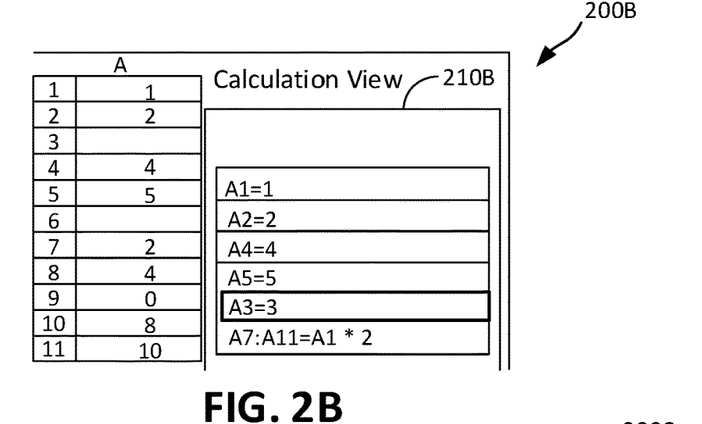
Figure 2C:
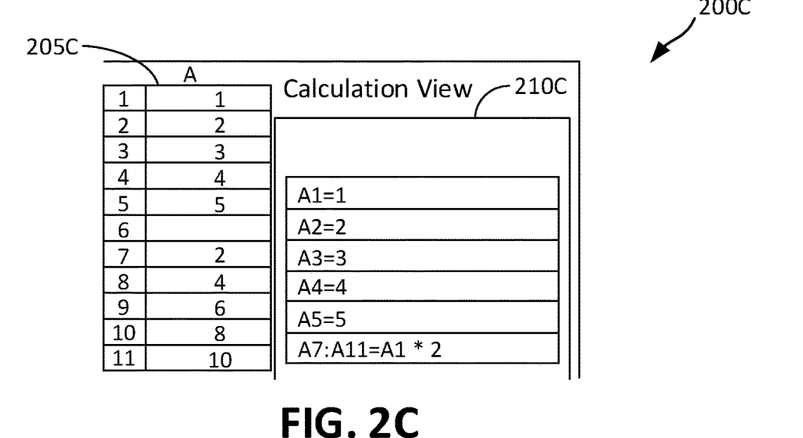

FIGS. 2A-2C illustrate exemplary user graphical interface screens depicting one implementation for ordering one or more pseudocells in the calculation view region of a display screen in a multi-region spreadsheet. FIG. 2A depicts column A of the grid view 205A including exemplary data in rows 1 through 11, while the corresponding calculation view pane 210A displays the associated formulas for each cell displayed in the grid view 205A. As can be seen, rows 1, 2, 4 and 5 include individual data, while rows A7 through A11 are filled with a range assignment formula. In one implementation, a new line (i.e., pseudocell) can be created in the calculation view pane by pressing enter while the cursor is in a currently filled pseudocell. If the cursor is in the last pseudocell, a new line is simply generated below the last pseudocell. Otherwise, a new pseudocell is generated after the selected pseudocell, as illustrated in calculation view pane 210A, where pressing enter while the cursor is in line 215A creates the pseudocell 220A. The formula in this pseudocell can pertain to any cell or range in the grid. In one implementation, the new pseudocell remains in the position it was entered until another cell in the grid view is selected, which triggers a reordering (i.e., regeneration) of the calculation view pane, at which point the formula is moved to its position according to spatial ordering, as shown in FIGS. 2B-2C. Spatial ordering orders the pseudocells in the calculation view by positions of the corresponding cells in the grid view (e.g., left to right, top to bottom).

In an exemplary implementation illustrated in FIGS. 2A-2C, a lexicographic ordering can be applied, listing the range assignments by their upper left corners in row-order, and by column-order within each row. Alternatively, the new pseudocell can remain in the position it was entered, until reception of a position change instruction from the user. This can prevent or avoid a negative user experience of having the user's formula moved around. This feature may be achieved by the calculation view pane remembering the position of pseudocells generated by users in the calculation view pane. An alternative ordering scheme can apply an ordering of the pseudocells in the calculation view by a topological sort of the formula dependency graph, which juxtaposes cells that are logically related.

FIGS. 2B-2C also illustrate how once a value is entered for cell A3 in the calculation view pane 210B, the cell A3 in the grid view 205C is filled with entered value automatically, and the value of the cell A9 automatically changes (according to the formula A7:A11=A1*2).

Figure 3A:
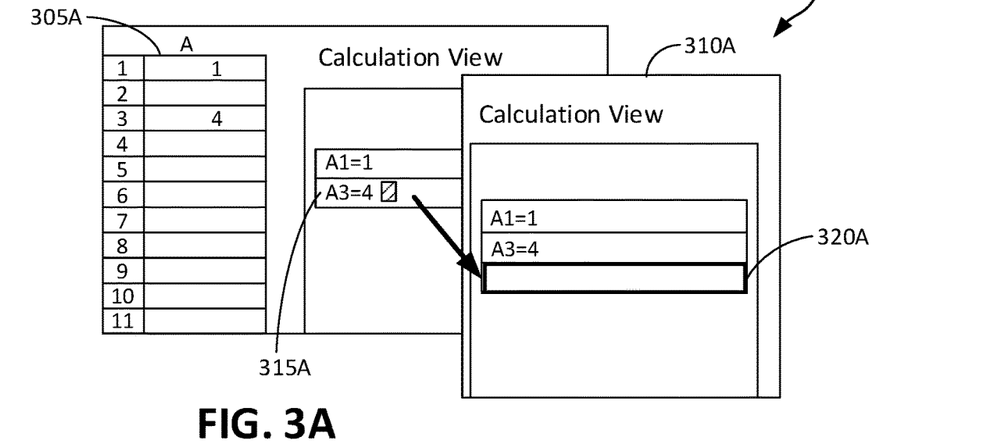
FIGS. 3A-3C illustrate other exemplary graphical user interface display screens displaying steps for using the calculation view pane of a multi-region display screen in a spreadsheet for entering data into a grid portion of the spreadsheet.
Figure 3B:
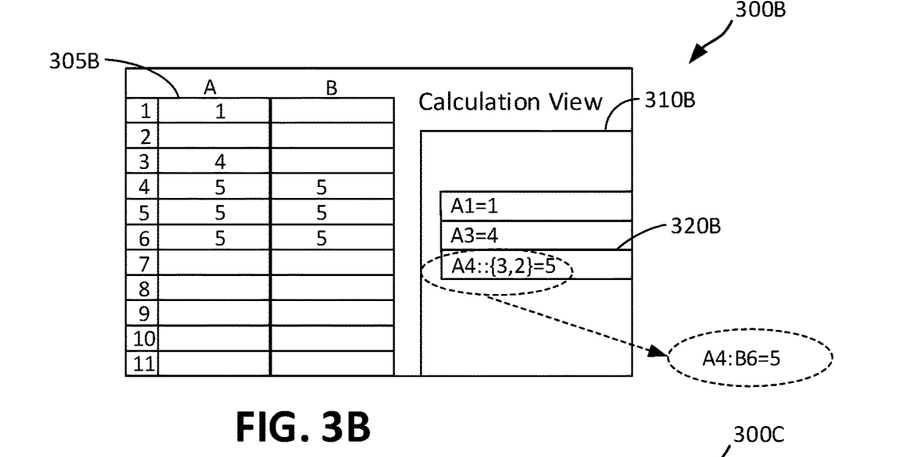
Figure 3C:
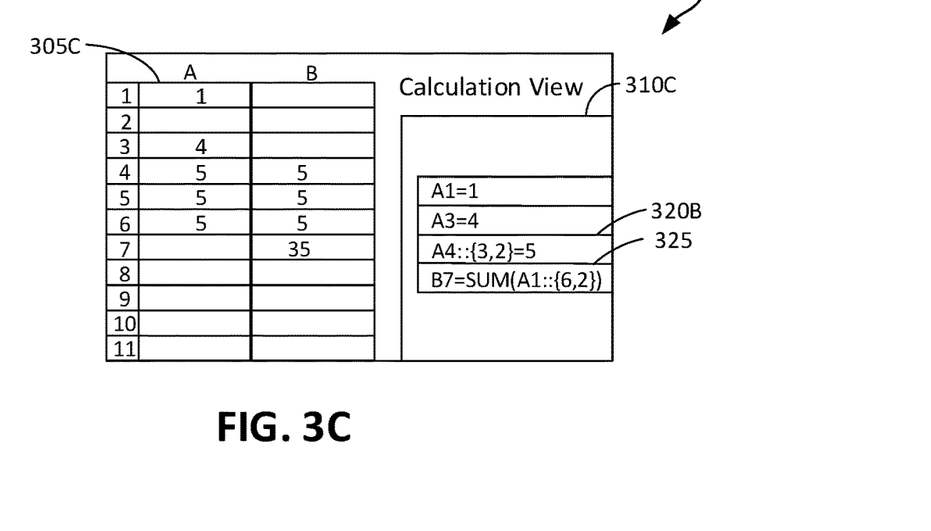

FIGS. 3A-3C illustrate another example of using the calculation view pane of a multi-region display screen in a spreadsheet for entering data into the grid portion of the spreadsheet. As shown in the display screen 300A of FIG. 3A, the calculation view pane 310A has been used to enter two numbers for cells A1 and A3 of the grid region 305A. As a result, cell A1 is filled with the value 1 and cell A3 is filled with the value 4. At this stage, while the cursor is in front of the formula in pseudocell 315A, pressing or otherwise selecting the enter key can create a new pseudocell underneath pseudocell 315A. That is, in at least one implementation of the calculation view pane, pressing enter while a pseudocell is in focus creates a new pseudocell underneath it. This combines the properties of a flat text editor and the grid to allow a user the flexibility to enter data into the grid as needed. In one implementation, pseudocells can only be empty while they are being edited. Thus, if a pseudocell is empty when it loses focus, it disappears. As a result, cell and range assignments can be deleted by deleting the contents of the corresponding pseudocell, and when the pseudocell loses focus, it disappears from the calculation view pane and so do its formulas on the grid. Thus, unlike in a text editor, where multiple blank lines can be entered by repeatedly pressing the enter key, the calculation view pane can be configured such that repeatedly hitting the enter key does nothing after the initial empty pseudocell is created. That is no new pseudocells will be created while an empty pseudocell is in focus.

Once a new pseudocell 320A is created, the user can enter text into the pseudocell to populate the grid as desired. For example, the user may enter A4::{3,2}=5 to assign a value to a range of cells. As discussed above, cell ranges can be identified using the Cell::{rows,cols} syntax, where Cell is the start cell, to indicate the number of rows and columns relative to the identified start cell that the range covers. Thus, A4::{3,2} identifies the rectangular range which includes cells A4 through A6 and B4 through B6. The number 3 within the textual notation A4::{3,2} indicates that the rectangular range includes three rows starting with row 4 (from A4) and two columns starting from A. The =5 portion of the A4::{3,2}=5 example assigns the value integer 5 to the rectangular range. As a result, referring to FIG. 3B display screen 300B, the corresponding rectangular range of cells in the grid region 305B is populated with the value 5, as soon as the user hits save or enter after typing the textual notation A4::{3,2}=5 into the pseudocell 320B. The Cell::{rows, cols} syntax can be referenced, for purposes of description, as "corner-size" notation, where "Cell" (for example, A4), meaning the starting cell, is the corner, written as a row-column position, and {3,2} is the size of the range, in terms of number of rows and number of columns, extending from the corner.

In an aspect, the corner-size notation can be applied in the formula of a range assignment. One implementation can be the notation form Cell=FUNC(Cell::{rows,cols}), where FUNC can be, for example, an arithmetic operation, or a Boolean logic operation, or any other defined function, of or on cells in the range {rows,cols}. One arbitrary example, illustrated in FIG. 3C display screen 300C, is a continuation of the example described in reference to FIG. 3B. Referring to FIG. 3C, example operations can include receiving user entries creating a new pseudocell 325 in calculation view 310C, following cell 320B, using the above-described pseudocell creation and entry operations, and receiving user entry of B7=SUM(A1::{6,2}) into 325, and activation of the SV button in field 120 (not explicitly visible in FIGS. 3B-3C). The entry B7=SUM(A1::{6,2}) defines cell B7 as the sum of the cells, from the starting cell A1 and extending over the range {6,2}, meaning 6 rows, 2 columns. The result, which is the sum of (1, 4, 5, 5, 5, 5, 5, 5), i.e., integer 35, appears in B7 of the grid region 305C.

As described above, the Cell::{rows,cols} syntax indicates the start cell for the formula assignment and the range, in rows and columns of the assignment. The indication of the start cell and of the range is direct, i.e., explicit identification of the start cell and range. The Cell::{rows,cols} syntax also indicates, albeit indirectly, the end cell position for the assignment, namely, the cell at the row-column position spaced from the start cell, in rows, one less than the row value in Cell::{rows, cols} and, in columns, one less than the cols value in Cell::{rows,cols}. It will therefore be understood that the term "indicates," as used herein in the context of the Cell::{rows,cols} syntax, encompasses the direct as well as the indirect meaning, except where explicitly stated otherwise.

Figure 4:
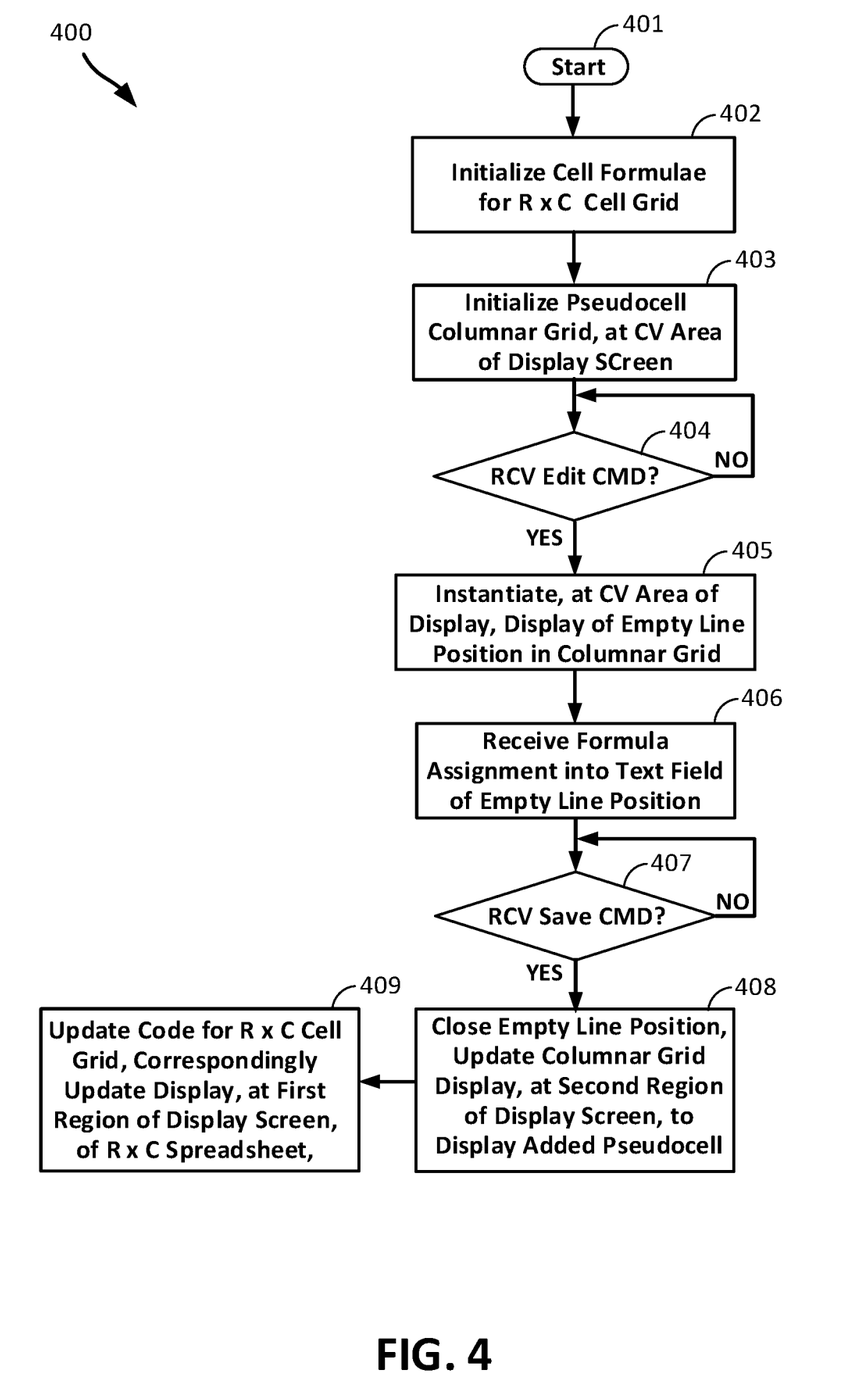
FIG. 4 is a flow chart representing an exemplary method for creating and editing cell calculations and definitions in a spreadsheet having multi-region display areas that provide real-time feedback observability through inspectable, user-understandable pseudocode.

FIG. 4 is a flow chart representing an exemplary method 400 for creating and editing cell calculations and definitions in a spreadsheet having multi-region screens that provide real-time feedback observability through an inspectable, user-understandable pseudocode. At 401, the method 400 starts by proceeding to initialize cell formulas for the rows and columns of the cell grid region (e.g., grid display 105A of FIG. 1A) of the display screen, at 402. The method 400 may start at 401, when a stored spreadsheet is opened or when a new spreadsheet is created. If a previously stored spreadsheet is being opened, method 400 may populate the cells of the grid display area with stored data and/or formulas as the cells are initiated at 402. If a new spreadsheet is being created, the initialization process may simply involve creating and displaying a standard grid.

Once the grid display area of the multi-region display screen is generated and/or initialized, method 400 proceeds to initialize the calculation view pane area of the multi-region display screen, at 403. This may be done by generating a blank calculation view display area for new spreadsheets or by initializing and populating a pseudocell columnar grid for previously stored spreadsheets containing data. If the previously stored spreadsheet contained information in the calculation view area of the display screen, this process may involve displaying the previously generated pseudocells.

Once both the grid area and the calculation view pane area of the multi-region display screen are initialized and displayed, method 400 determines, at step 404, if an edit command in the calculation view area of the display screen has been received. As a long as no edit command is received, the method returns back to step 404 to wait for an edit command. Once it is determined, however, that an edit command has been received, method 400 proceeds to step 405 to instantiate display of an empty line position in the columnar grid of the calculation view area. In one implementation, receiving the command may include receiving an indication that the enter key has been pressed or otherwise selected, while the cursor is in the calculation view area of the multi-region display, and the step 405 may involve creating and displaying a new pseudocell (i.e., blank cell) underneath the pseudocell in which the cursor was located. For new spreadsheets which do not contain any data in their calculation view areas, the command may simply comprise receiving an indication that the calculation view is selected by for example, double clicking on any part of the calculation view area.

After creating and displaying a new pseudocell, method 400 receives a formula and/or other textual data into the text field of the empty line position of the new pseudocell, at 406. This may include assigning a name to one or more cells in the grid area, assigning a value to one or more cells in the grid area, assigning a formula or a range to a range of cells in the grid area, and the like. Once the textual information has been received at the empty line position, the method 400 determines if a save command is received, at 407. In one implementation, the save command may include any action that moves the cursor away from the new pseudocell and into a different region of the display. For example, moving the cursor to the grid area of the display screen may be taken as a save command. The save command may also be directly expressed by the user, when the user presses the enter key after entering the desired textual data into the new pseudocell. In such an instance, the method 400 may save the command and create a new pseudocell underneath the one just saved. In other configurations, the save command may include pressing a button designed for saving the spreadsheet. If it is determined, at 407, that a save command has not been received, the method returns back to step 407 to wait until a save command is received.

Once it is determined, at 407, that a save command has been received, method 400 proceeds to close the empty line position (which is now no longer empty) and update the columnar grid of the calculation view pane to display the newly generated and filled pseudocell, at 408. Once the calculation view pane area of the multi-region display has been updated with the new data, method 400 correspondingly updates the code for the row and column grid area of the display such that textual data entered into the new pseudocell modifies the indicated cells of the grid area as desired and indicated by the textual data, at 409. For example, if the textual data assigned a value to one cell of the grid area, the corresponding cell in the grid area would be automatically populated with the value which is then displayed in the corresponding cell of the grid area.

In this manner, method 400 automatically populates and modifies the grid region of the display area based on textual data entered into the calculation view pane. This can simplify the process of entering data into a spreadsheet by providing options for assigning names, ranges and formulas which can be clearly seen and checked for possible errors, thus saving time and improving accuracy. However, some users may still prefer to enter the data into the grid area of the spreadsheet. This may be particularly the case for users that are particularly skilled in entering data into the grid or otherwise feel more comfortable using a process they are already familiar with, or when copy/pasting data from other types of spreadsheets or grids that do not include the calculation view pane. In such cases, the calculation view pane may still be useful in checking for errors by being automatically updated and populated. This may involve for example, automatically creating a pseudocell in the calculation view pane anytime a value is entered into a cell in the grid area of the display region. However, such a process could lead to overpopulation of the calculation view pane which may defeat the purpose of being able to quickly and efficiently review formulas and range assignments for errors. As a result, in one implementation, the calculation view pane automatically creates a pseudocell for each formula manually entered into the grid area of the display areas. For cells of the grid area that are simply manually filled with data, the calculation view pane does not display any information.

Figure 5:
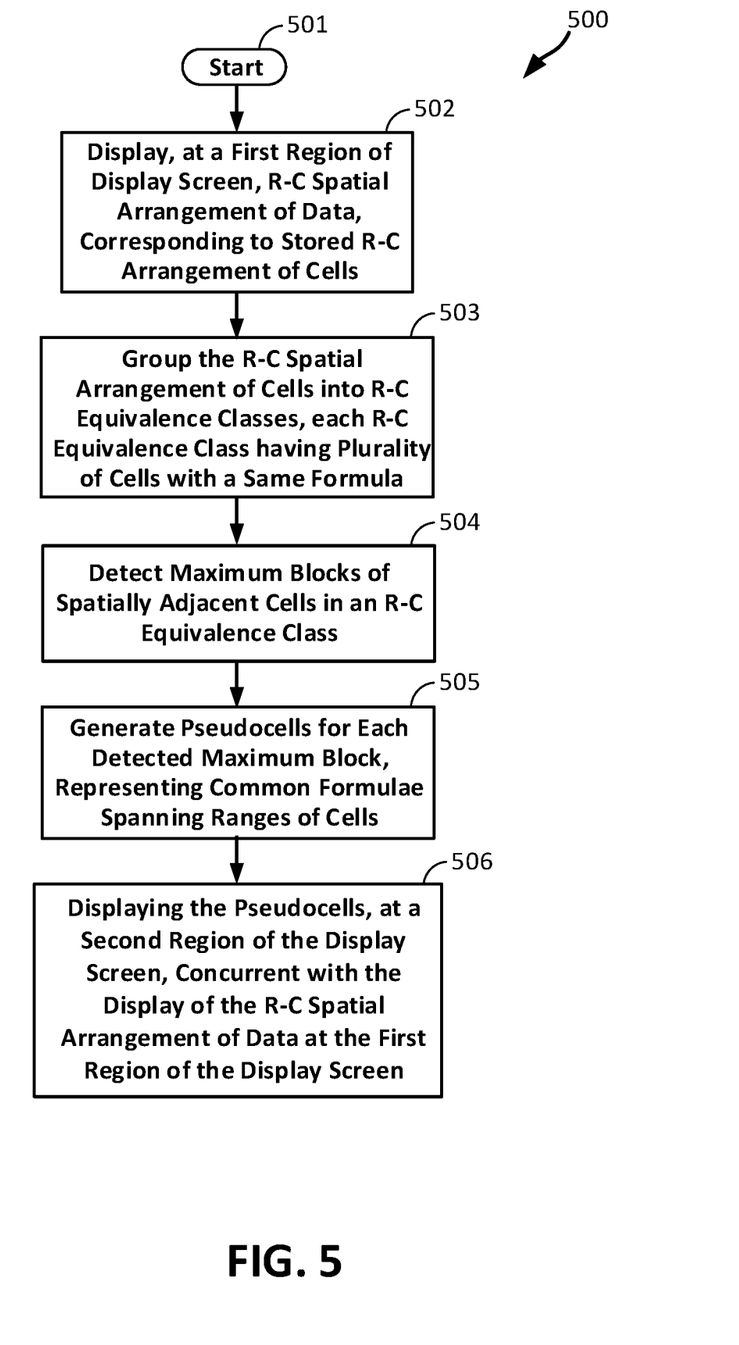
FIG. 5 is a flow chart representing an exemplary method for a block detection process and display of corresponding textual data in a first region of a spreadsheet having multi-region display areas, that provide real-time feedback observability through inspectable, user-understandable pseudocode.

FIG. 5 is a flow chart representing an exemplary method 500 for a block detection process and display of corresponding textual data in a calculation view region of a spreadsheet having multi-region screens that provide real-time feedback observability through an inspectable, user-understandable pseudocode. At 501, the method 500 starts when an indication is received from the user that a block detection may be necessary. For example, method 500 may start each time a new formula is entered into a cell in the grid area of the display screen. In other implementations, method 500 may be initiated every time the save command is received or anytime a previously stored spreadsheet is reopened, among others. Once started, method 500 may proceed to display at a first region of the display screen (i.e., the grid area) row and column arrangement of data corresponding to stored data for rows and columns of the grid region, at 502. This step may be eliminated in implementations in which the row and column arrangement of data is already being displayed.

Method 500 then proceeds to group all the cells in the grid area into R1C1 equivalence classes. This is done by placing cells having the same R1C1 formula in the same class, at 503. For example, all cells having a formula for R[−1]C[0]+1 may be placed in the same equivalence class. Alternatively, the equivalence classes may only be created for cells for which a formula and/or assignment does not already exist in the calculation view pane. For example, if the calculation view pane already includes a pseudocell with the formula A3:A9=A2+1, and it is determined at step 503 that cells A3 through A9 have the same formula, a separate equivalence class may not be created for those cells.

Once all the previously unidentified equivalence classes have been created, method 500 may proceed to detect, for each class, maximal rectangular ranges (called 'blocks'), at 504. This may be done using a greedy flood-filling operation which operates by choosing the top-left cell in the class to seed the block. To achieve this, the cell to the right of the seed may be checked. If it is determined that the cell belongs to the same class, then the block is grown to include it. This is repeated until the block has achieved a maximal left-right extent. The block is then grown vertically by checking if the corresponding cells in the row below are also part of the equivalence class. Once it can no longer be grown vertically, this maximal block is then removed from the equivalence class. A new top-left seed is picked and grown, and the process is repeated until all the cells in the equivalence class have been assimilated as part of a block. If there are edge cells in the detected block for which it is not clear which block they belong to, the method may give preference to the top-leftmost block. For example, for an L shaped region of cells containing R1C1 equivalent formulas, where the cell in the bottom corner of this region may reasonably belong to either arm of the L, preference is given to the vertical arm.

Once maximum blocks have been detected for all new equivalence classes, each block so detected becomes a range assignment in the calculation view pane. This is done, at 505, by generating a new pseudocell in the calculation view pane for each detected block and populating the pseudocell with the formula for the maximum block detected and assigning the formula to the range of cells in the block. The textual data displayed in the pseudocell is generated to correspond with a text entered in the calculation view pane if the user was populating the grid using the calculation view pane instead of the grid. The pseudocells are then displayed concurrent with the display of the row column spatial arrangement of data in the grid area of the display.

Even after block detection has collapsed blocks of formulas into single pseudocells, there is still potential for calculation view to become cluttered. For instance, for large spreadsheets, if all the cells containing base data in the grid area are displayed in the calculation view pane, a large number of pseudocells displaying base data would obscure the range assignments for the other columns, thus eliminating the desired visibility and clarity of view afforded by the calculation view pane. To improve this, the calculation view pane may provide a filtering feature intended to filter out literal undesired pseudocells. For example, the filtering feature may filter out pseudocells containing literal values by default (with the option to show them if necessary). The filtering feature may also provide options for advanced sorting and filtering functionality, such as "show only formulas within a certain range", or "show only formulas containing some subexpression", or "show formulas which evaluate to a certain type, e.g., Boolean", or even simpler options such as "sort by formula length."

Figure 6:
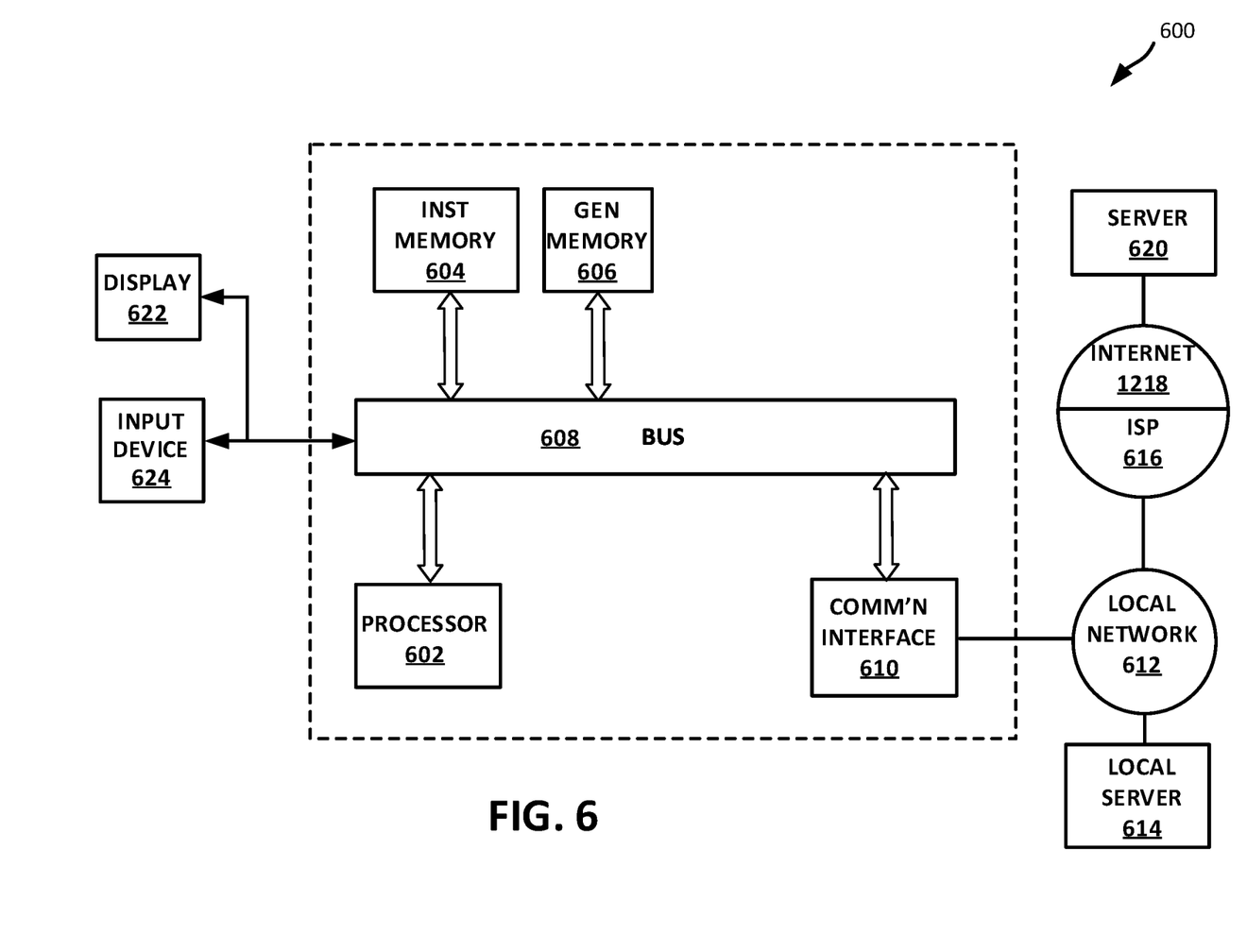
FIG. 6 is a functional block diagram of an example general purpose programmable processor device, configurable according to and to provide various processes and features according to the present disclosure.

FIG. 6 is a functional block diagram of a processor 600, configured to perform operations and processes in systems and methods according to the present disclosure. It will be understood that functional blocks illustrated in FIG. 6 are logical blocks, and do not necessarily correspond to particular hardware.

Referring to FIG. 6, the processor 600 can include a data processor 601, a general purpose memory 602, and an instruction memory 603 coupled by a bus 604. The instruction memory 603 can include a tangible medium retrievably storing computer-readable instructions that when executed by the data processor 601 cause the processor to perform operations in accordance with the flow diagrams of FIGS. 4 and 5, and as described in reference to FIGS. 1A-1D, 2A-2C, and 3A-3B. The processor 600 can include a communication interface 605, to a local network 606, which can connect to a local server 607. The local network 606 can also connect, through an Internet Service Provider (ISP) Internet 608, and to the Internet 609. The local network 606 can access a remote server 610 through the Internet. The processor 600 can include a display 611. In an aspect, the display 611 can have sufficient area or other capability to provide concurrent display, and usability, of spreadsheet and GUI line editor. The processor 600 can include an input device 612, e.g., a touchscreen, mouse, keyboard, or voice interface.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any such first, second relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Therefore, the following claims are hereby incorporated into the Detailed Description, with each claim standing on its own as a separately claimed subject matter.

What is claimed is:
1. A computing device comprising:
a logic machine;
a display screen coupled to the logic machine; and
a storage machine, coupled to the logic machine, retrievably storing instructions executable by the logic machine that, when executed, cause the logic machine to:
display, at a first region of a display screen, a row-column arrangement of data, indicating data content of cells within a row-column arrangement of cells;

display, at a second region of the display screen, formula assignments for one or more cells within the row-column arrangement of cells;
receive user input in the second region of the display screen, the user input designating a range of cells from among the row-column arrangement of cells, and the user input including a formula for the designated range of cells;
determine, based on at least the formula or the designated range of cells, whether the formula should be offset for one or more cells of the designated range of cells;
upon determining that the formula should be offset for the one or more cells of the designated range of cells, populating the one or more cells of the designated range of cells in the first region of the display screen with an offset formula; and
upon determining that the formula should not be offset for the one or more cells of the designated range of cells, populating the one or more cells of the designated range of cells with the formula.

2. The computing device of claim 1, wherein
the user input designating the range of cells includes an indicator of a range start cell, and an indicator of the range, and
the indicator of the range start cell and the indicator of the range, in combination, provide an indicator of a range end cell.

3. The computing device of claim 2, wherein the formula is in a corner-size notation that indicates the range start cell as a row-column position, the row-column position being a corner of the range, and indicates the assigned range as a size, in number of rows and number of columns that the range extends from the range start cell.

4. The computing device of claim 1, wherein the user input including the formula and the designated range of cells is entered at a given line position among a plurality of line positions in the second region.

5. The computing device of claim 1, wherein the formula includes assigning a name to at least one of the one or more cells within the row-column arrangement of cells.

6. The computing device of claim 1, wherein the formula includes a spreadsheet function for calculating a value based on the data content of the one or more cells within the row-column arrangement of cells.

7. The computing device of claim 4, wherein the formula is a first formula, the designated range of cells for the formula includes a first cell, and the given line position is a first line position, and the instructions executable by the logic machine further include instructions, that, when executed, cause the logic machine to:
receive an add cell definition command, identifying a second formula and an assigned range of cells for the second formula that includes a second cell within the row-column arrangement of cells, and, in response, and
display, at a second line position among the plurality of line positions, the second formula and the second formula's assigned range of cells within the row-column arrangement of cells.

8. The computing device of claim 7, wherein the instructions executable by the logic machine further include instructions, that, when executed, cause the logic machine to:
update the displaying, in the first region of the display screen, the row-column arrangement of data, concurrent with displaying, at the second line position, the second formula and the second formula's assigned range of cells within the row-column arrangement of cells, wherein to update the displaying, the instructions further include instructions that, when executed, cause the logic machine to:
compute a respective data content for the second cell, based at least in part, on the second formula,
update the row-column arrangement of data to include the respective computed data content for the second cell, and
update the displaying, at the first region of the display screen, the row-column arrangement of data, to indicate the respective computed data content for the second cell.

9. A method comprising:
receiving a machine-understandable row-column arrangement of data, indicating data content of cells within a row-column arrangement of cells;
displaying, at a first region of a display screen, the row-column arrangement of data, indicating the data content of cells within the row-column arrangement of cells;
displaying, at a second region of the display screen, a columnar grid of visible pseudocells;
receiving user input in one of the visible pseudocells, the user input designating a range of cells from among the row-column arrangement of cells, and the user input including a formula for the designated range of cells;
determining, based on at least the formula or the designated range of cells, whether the formula should be offset for one or more cells of the designated range of cells;
upon determining that the formula should be offset for the one or more cells of the designated range of cells, populating the one or more cells of the designated range of cells in the first region of the display screen with an offset formula; and
upon determining that the formula should not be offset for the one or more cells of the designated range of cells, populating the one or more cells of the designated range of cells with the formula.

10. The method of claim 9, wherein the displayed columnar grid of visible pseudocells includes a plurality of row positions, and the method further comprises:
receiving an edit command and, in response, instantiating a new row position in the plurality of row positions, and including in the new row position a visible edit field,
receiving, into the visible edit field of the new row position, a cell row-column identifier, an inserted formula, and an assigned range of cells for assignment of the inserted formula,
receiving a save command and, in response, automatically:
assigning the inserted formula to a cell identified by the cell row-column identifier, and to each cell within the assigned range of cells, and
updating a corresponding pseudocell visible within the columnar grid of pseudocells to reflect assigning the inserted formula to the cell identified by the cell row-column identifier, and to each cell within the assigned range of cells.

11. The method of claim 10, further comprising:
in an additional automatic response to receiving the save command, updating the displaying, at the first region of the display screen, the row-column arrangement of data, to indicate computations corresponding to the inserted formula.

* * * * *